United States Patent
Fichtner et al.

(10) Patent No.: US 11,441,684 B2
(45) Date of Patent: Sep. 13, 2022

(54) SEALING COVER ELEMENT IN A MECHANICAL SEAL

(71) Applicant: A.W. CHESTERTON COMPANY, Groveland, MA (US)

(72) Inventors: Josef Fichtner, Wolfratshausen (DE); Pierre Aouni Alfons Al-Darra, Eching (DE)

(73) Assignee: A.W. CHESTERTON COMPANY, Groveland, MA (US)

( * ) Notice: Subject to any disclaimer, the term of this patent is extended or adjusted under 35 U.S.C. 154(b) by 50 days.

(21) Appl. No.: 16/844,353

(22) Filed: Apr. 9, 2020

(65) Prior Publication Data
US 2020/0325991 A1     Oct. 15, 2020

Related U.S. Application Data

(60) Provisional application No. 62/832,204, filed on Apr. 10, 2019.

(51) Int. Cl.
*F16J 15/3284*     (2016.01)
(52) U.S. Cl.
CPC ................ *F16J 15/3284* (2013.01)

(58) Field of Classification Search
CPC ...... F16J 15/3284; F16J 15/34; F16J 15/3464; F16J 15/348
See application file for complete search history.

(56) References Cited

U.S. PATENT DOCUMENTS

| | | | | |
|---|---|---|---|---|
| 5,630,699 A | * | 5/1997 | Kirby | F04D 29/126 277/361 |
| 2011/0221136 A1 | | 9/2011 | Dudek | |

FOREIGN PATENT DOCUMENTS

| | | | |
|---|---|---|---|
| EP | 0528029 A1 | 2/1993 | |
| WO | WO-2018123617 A1 * | 7/2018 | ............... F16J 15/34 |

OTHER PUBLICATIONS

International Search Report and Written Opinion, PCT/US2020/027432, dated Jul. 21, 2020, 10 pages.

* cited by examiner

*Primary Examiner* — Gilbert Y Lee
(74) *Attorney, Agent, or Firm* — Nelson Mullins Riley & Scarborough LLP; Anthony A Laurentano

(57) ABSTRACT

A mechanical seal that includes a holder assembly having a fastener-receiving aperture formed therein and having a pair of grooves disposed on either side of the fastener-receiving aperture. A sealing cover element is disposed over the fastener-receiving aperture and has opposed leg portions that seat within the groove.

8 Claims, 3 Drawing Sheets

SEALING COVER ELEMENT IN A MECHANICAL SEAL

RELATED APPLICATION

The present application claims priority to U.S. provisional patent application Ser. No. 62/832,204, filed on Apr. 10, 2019, and entitled COVER FOR ELASTOMER RING IN A MECHANICAL SEAL, the contents of which are herein incorporated by reference.

BACKGROUND OF THE INVENTION

In conventional mechanical seals, the holder portion of the mechanical seal is typically secured, such as by clamping, between an impeller and a shaft of commercial equipment, such as for example a pump, so as to reduce the number of crevices in the seal. This helps reduce unwanted leakage of process fluid from the pump. However, this securing technique requires field personnel to modify the design of the mechanical seal by introducing the securing mechanism. This can compromise the overall sealing integrity of the mechanical seal.

SUMMARY OF THE INVENTION

The present invention is directed to a mechanical seal that employs a sealing cover element that is configured for overlying or covering a fastener-receiving aperture formed in a holder assembly, thus forming a fluid tight seal. The sealing cover element 110 has leg portions that seat within grooves that are disposed on both sides of the fastener-receiving aperture so as to secure the sealing cover element to the holder assembly.

According to one aspect, the present invention includes a mechanical seal for mounting about a shaft, comprising a holder assembly, a rotary seal ring coupled to the holder assembly, and a stationary seal ring disposed adjacent to the rotary seal ring. The holder assembly includes a main body that has an inner surface and an opposed outer surface, and one or more fastener-receiving apertures that extends between the inner surface and the outer surface and is sized and configured for seating a fastener. The holder assembly also includes first and second grooves formed in the outer surface, where the first groove is formed on one side of the fastener-receiving aperture and the second groove is formed on the other side of the fastener-receiving aperture.

The mechanical seal also includes a sealing cover element having a main body having a first leg portion, an opposed second leg portion, and an intermediate portion disposed between and coupled to the first and second leg portions. The first leg portion of the sealing cover element is sized and configured for seating within the first groove, the second leg portion of the sealing cover element is sized and configured for seating within the second groove, and the intermediate portion of the sealing cover element covers the fastener-receiving aperture.

According to another aspect, the intermediate portion of the sealing cover element has a top surface and an opposed bottom surface, and the first and second leg portions each have a top surface and an opposed bottom surface. The top surface of the intermediate portion is radially spaced from the top surface of the first and second leg portions. Also, the bottom surface of the first and second leg portions is radially spaced from the bottom surface of the intermediate portion. The sealing cover element is formed from an elastomer material and preferably has an annular shape.

According to another embodiment, the inner surface of the holder assembly includes a first sealing groove for seating a first sealing element and an axially spaced second sealing groove for seating a second sealing element. The first sealing groove is formed on one side of the fastener-receiving aperture and the second sealing groove is formed on the other side of the fastener-receiving aperture. Thus, in operation, the first sealing element is positioned for contacting the shaft and the second sealing element is positioned for contacting the stationary seal ring.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
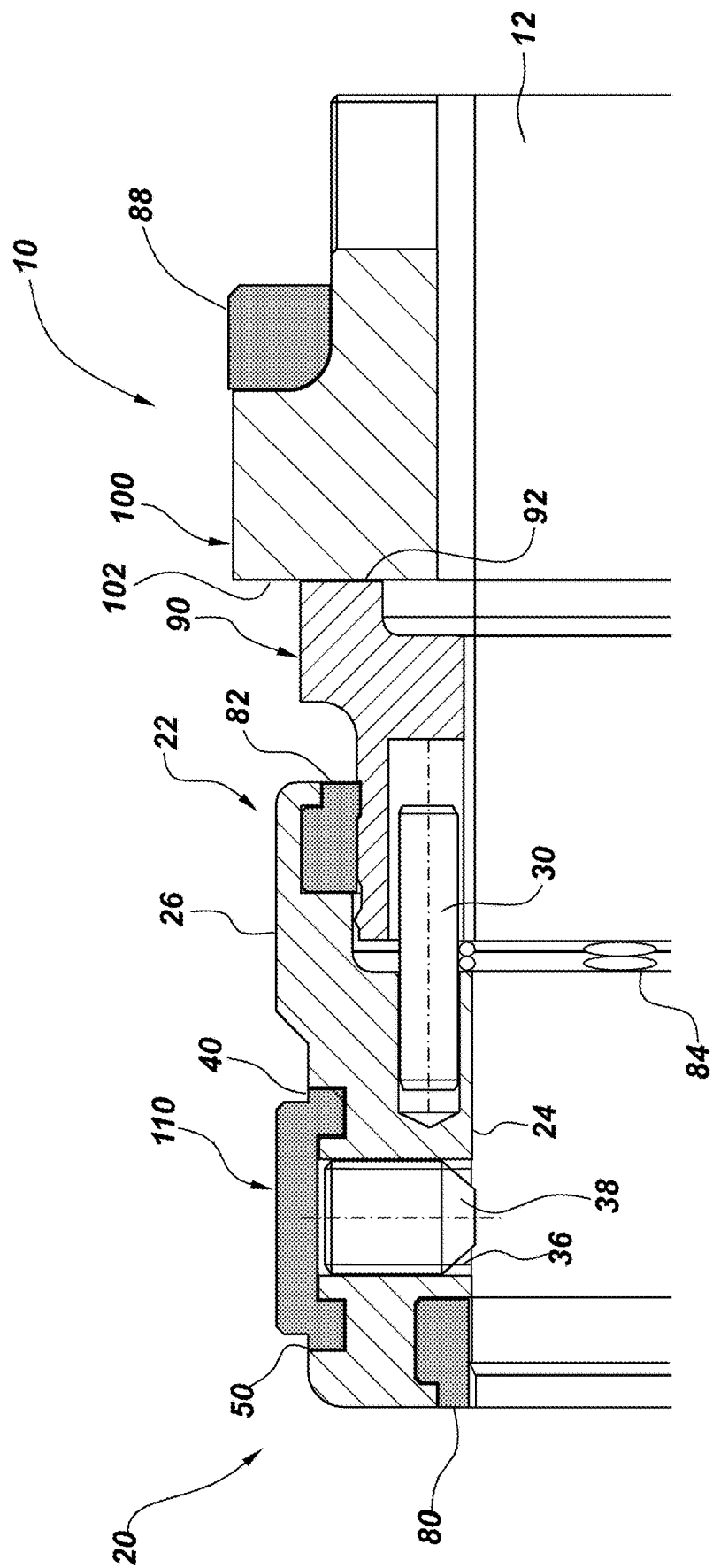
FIG. 1 is a partial cross-sectional view of a mechanical seal employing a sealing cover element to seal a set screw aperture according to the teachings of the present invention.

The present invention provides a sealing cover element for providing sealing of a set screw aperture formed in a holder assembly of a mechanical seal. The present invention will be described below relative to illustrated embodiments. Those skilled in the art will appreciate that the present invention may be implemented in a number of different applications and embodiments and is not specifically limited in its application to the particular embodiment depicted herein.

The term "shaft" as used herein is intended to refer to any suitable device in a mechanical system to which a seal can be mounted and includes shafts, rods and other known devices.

The terms "axial" and "axially" as used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical seal that are disposed proximate to the stationary equipment (e.g., mechanical system) employing the mechanical seal. As such, this term also refers to the components of the mechanical seal that are mounted to or within the stationary equipment or are disposed the deepest within or closest to the equipment (e.g., inboard). Conversely, the term "axially outer" as used herein refers to the portion of stationary equipment and the mechanical seal that is disposed distal from (e.g., outboard) of the mechanical seal.

The term "radially inner" as used herein refers to the portion of the mechanical seal or associated components that are proximate to a shaft. Conversely, the term "radially outer" as used herein refers to the portion of the mechanical seal or associated components that are distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

The terms "process medium" and/or "process fluid" as used herein generally refer to the medium or fluid being transferred through the stationary equipment. In pump applications, for example, the process medium is the fluid being pumped through the pump housing.

The term "gland" as used herein is intended to include any suitable structure that enables, facilitates or assists securing the mechanical seal to the stationary equipment, while concomitantly surrounding or housing, at least partially, one or more seal components. If desired, the gland can also provide fluid access to the mechanical seal.

The term "mechanical seal" as used herein is intended to include various types of mechanical seals, including single seals, split seals, tandem seals, dual seals, concentric seals, gas seals, spiral seals, solid seals, split seals and other known seal types and configurations.

Figure 2:
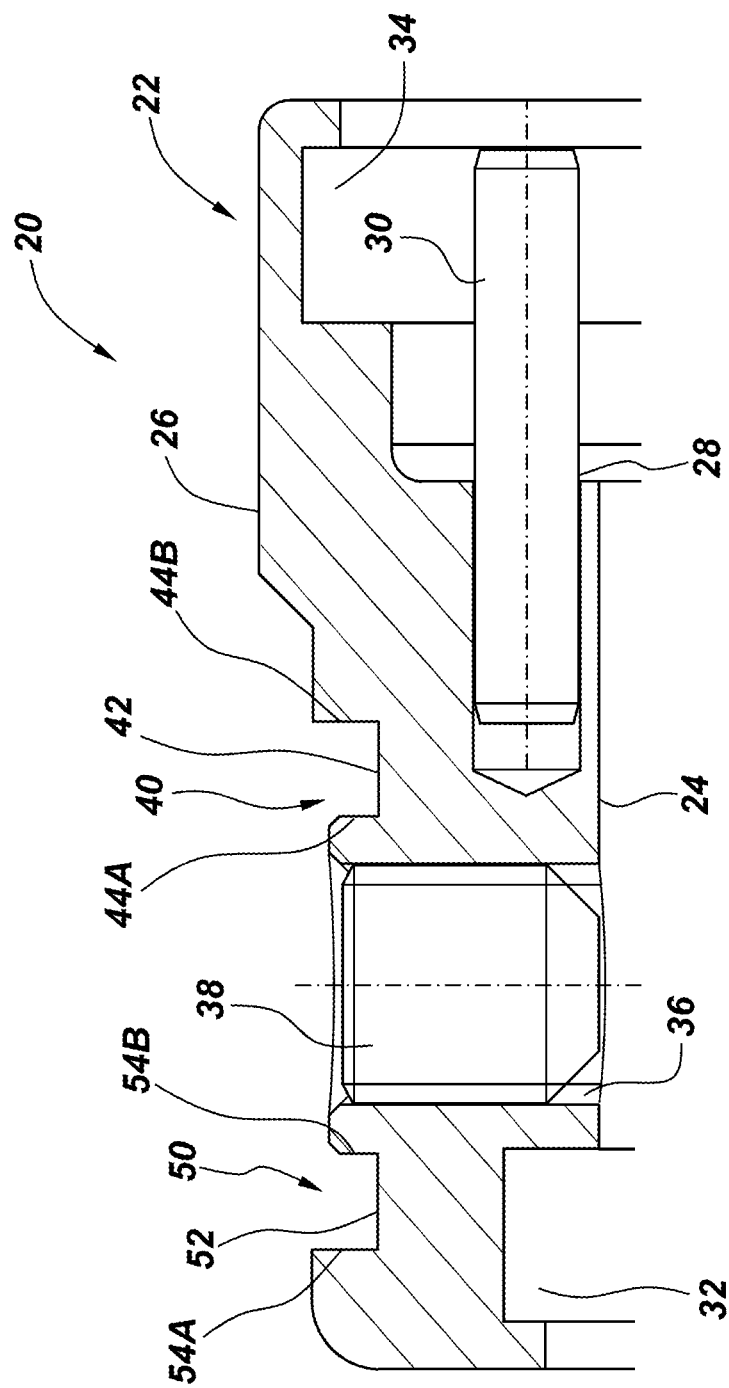
FIG. 2 is a partial cross-sectional view of the holder element of the mechanical seal according to the teachings of the present invention.
Figure 3:
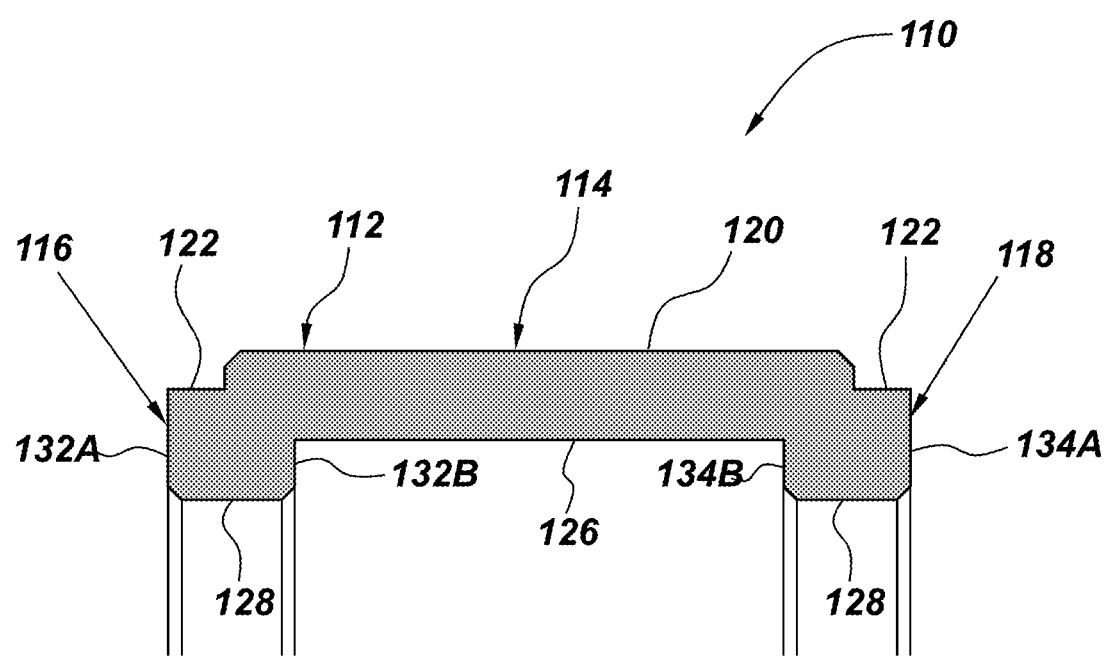
FIG. 3 is a partial cross-sectional view of the sealing cover element of FIG. 1 according to the teachings of the present invention.

As shown in FIGS. 1-3, the mechanical seal 10 of the present invention comprises an annular holder assembly 20, an annular rotary seal ring 90, an annular stationary seal ring 100, and additional annular sealing elements, all of which are disposed about a shaft 12. The holder assembly 20 is typically disposed within an annular gland (not shown), which is secured to stationary equipment, as is known in the art. The rotary seal ring 90 has a sealing surface 92 that is configured to be disposed in sealing contact with a sealing surface 102 of the stationary seal ring 100. The mechanical seal 10 also includes one or more biasing elements, such as springs 84, that are mounted between a back side or rear portion of the rotary seal ring 90 and an inner radial stepped surface of the holder assembly 20 for providing a biasing force to the rear portion of the rotary seal ring 90.

The illustrated holder assembly 20 includes a main body 22 having an inner surface 24 and an outer surface 26. The inner surface 24 has an inner set screw aperture 28 formed therein for seating a fastener, such as a pin or a set screw 30. The pin or set screw 30 helps couple the rotary seal ring 90 to the holder assembly 20. The inner surface 24 also has formed therein an innermost sealing groove 32 that is sized and configured for seating a sealing element 80. The sealing element 80 provides a fluid-tight seal between the axially innermost portion of the holder assembly 20 and the shaft 12. The inner surface 24 also includes an axially outermost sealing groove 34 for seating a sealing element 82. The sealing element 82 provides a seal between the holder assembly 20 and a radially outer surface of the rotary seal ring 90. An additional sealing element 88 can be employed to provide sealing about an upper portion of the stationary seal ring 100.

The main body 22 of the holder assembly 20 also includes a fastener-receiving aperture 36 that is formed between the outer surface 26 and the inner surface 24 thereof. Specifically, the fastener-receiving aperture 38 fully extends between the inner and outer surfaces of the holder assembly 20. The fastener-receiving aperture 36 is sized and configured for seating a fastener, such as a set screw 38. The outer surface 26 of the main body 22 further comprises a pair of sealing element grooves 40, 50 that are disposed on either side of the fastener-receiving aperture 36 and hence are axially spaced apart along the outer surface 26. The grooves 40, 50 are preferably disposed relatively adjacent to the fastener-receiving aperture 36. The grooves are sized and configured for seating a portion of an annular sealing cover element 110. According to one embodiment, the holder assembly 20 can have a plurality of fastener-receiving apertures 36 formed therein. The set screws 38 help position and mount the mechanical seal 10 at one or more selected positions, and help mechanically couple the holder assembly 20 to the shaft 12. The sealing cover element 110 helps minimize or prevent process fluid from leaking past the set screw 38 through the aperture 36.

As shown in FIGS. 1-2, the groove 40 includes a groove bottom or floor 42 and a pair of opposed groove sidewalls 44A, 44B. Similarly, the groove 50 includes a groove floor 52 and a pair of opposed sidewalls 54A, 54B. The sidewalls of the grooves 40, 50 can be configured so as to be generally straight (i.e., generally vertical or radially extending) or can be angled relative to an elongated axis of the holder assembly 20. The grooves 40, 50 can be identical in size and shape or can be differently configured.

As shown in FIG. 3, the sealing cover element 110 has a main body 112 that has a pair of opposed leg portions 116, 118 that are coupled together by an intermediate portion 114. The leg portions 116, 118 are formed at opposed ends of the sealing cover element 110. The intermediate portion 114 has a top surface 120 that is spaced both axially and radially (e.g., horizontally and vertically) from a top surface 122 of the leg portions 116, 118. Similarly, a bottom surface 126 of the intermediate portion 114 is spaced both axially and radially (e.g., both horizontally and radially) from the bottom surfaces 128 of the leg portions 116, 118. Each of the leg portions 116, 188 also includes sidewalls. For example, the leg portion 116 includes opposed sidewalls 132A, 132B and the leg portion 118 includes opposed sidewalls 134A, 134B. The opposed sidewalls meet the bottom surface 128 to form corner or edge portions that can be relatively straight (e.g., at 90 degree angles) or can be rounded or curved. The leg portions 118, 118 can have dimensions that are slightly larger than the dimensions of the groves 40, 50 such that the leg portions when seated within the grooves form a frictional or mechanical fit. Moreover, the intermediate portion 114 has a length that corresponds to the axial distance between the grooves 40, 50. The sealing cover element 110 can be made of any suitable resilient material, and can be formed from an elastomer material.

In operation, the mechanical seal 10 of the present invention can be assembled and then mounted to the stationary equipment (not shown). When assembled, the rotary seal ring 90 is coupled to the holder assembly 20 by the pin or set screw 30. The holder assembly 20 is then axially positioned along the shaft 12 of the stationary equipment and tightened relative thereto using the set screws 38. To avoid any leakage passing the set screws 38, the sealing cover element 110 is placed over the set screws 38 and corresponding fastener-receiving apertures 36, thus forming a fluid-tight seal. In order to prevent the sealing cover element 110 from being accidentally removed or spun off of the mechanical seal 10 when the shaft rotates at higher speeds, the sealing cover element 110 can be stretched over the set screws 38. Specifically, the leg portion 116 seats within the groove 50 and the leg portion 118 seats within the groove 40. When the leg portions 116, 118 are seated or pressed within the grooves 40, 50, the intermediate portion 114 of the sealing cover element 110 spans or extends between the grooves 40, 50 and covers the fastener-receiving apertures 36 and the set screws 38 mounted therein. That is, the bottom surface 128 of the leg portion 116 contacts the floor 52 of the groove 50, and the sidewalls 132A, 132B of the leg portion 116 contact the sidewalls 54A, 54B, respectively, of the groove 50. Likewise, the bottom surface 128 of the leg portion 118 contacts the floor 42 of the groove 40, and the sidewalls 134A, 134B of the leg portion 118 contact the sidewalls 44A, 44B, respectively, of the groove 40. The mounting or seating arrangement of the sealing cover element 110 helps prevent fluid from passing or leaking past the thread holes of the set screw aperture 36 and associated set screws 38. The leg portions 116, 188 of the sealing cover element 110 are axially squeezed when mounted within the grooves 40, 50 so as to avoid any potential leakage from the set screws, thus attaining a substantially fluid-tight and crevice-free design.

Further, the holder assembly 20 can be configured such that the sealing cover element 110 can be mounted on the inner surface 24 of the main body 22 thereof rather than on the outer surface 26, as shown. In this embodiment, the grooves 40, 50 are formed on the inner surface 24 on either side of the fastener-receiving aperture 36. The grooves 40, 50 can be configured such that the leg portions 116, 188 of the sealing cover element 110 are axially squeezed into the grooves. The sidewalls of the grooves 40, 50 are configured so as to be generally straight (i.e., generally vertical or radially extending) or can be angled relative to an elongated axis of the holder.

Based on the design and configuration of the sealing cover element 110, the sealing cover element is able to meet the space constraint requirements of the mechanical seal 10 and associated stationary equipment. Moreover, the sealing cover element 110 in combination with other sealing elements serve to create a crevice-free environment, which is essential for applications where micro bacterial grow is not permitted.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A mechanical seal for mounting about a shaft, comprising
    a holder assembly having
        a main body having an inner surface and an opposed outer surface, wherein the main body has one or more fastener-receiving apertures formed therein and extending between the inner surface and the outer surface and being sized and configured for seating a fastener,
        first and second grooves formed in the outer surface, wherein the first groove is formed on one side of the fastener-receiving aperture and the second groove is formed on the other side of the fastener-receiving aperture,
    a rotary seal ring coupled to the holder assembly,
    a stationary seal ring disposed adjacent to the rotary seal ring, and
    a sealing cover element having a main body having a first leg portion, an opposed second leg portion, and an intermediate portion disposed between and coupled to the first and second leg portions,
    wherein the first leg portion of the sealing cover element is sized and configured for seating within the first groove, the second leg portion of the sealing cover element is sized and configured for seating within the second groove, and the intermediate portion of the sealing cover element covers the fastener-receiving aperture,
    wherein the intermediate portion of the sealing cover element has a top surface and an opposed bottom surface, and the first and second leg portions each have a top surface and an opposed bottom surface, wherein the top surface of the intermediate portion is radially spaced from the top surface of the first and second leg portions.

2. The mechanical seal of claim 1, wherein the bottom surface of the first and second leg portions is radially spaced from the bottom surface of the intermediate portion.

3. The mechanical seal of claim 1, wherein the sealing cover element is formed from an elastomer material.

4. The mechanical seal of claim 1, wherein the sealing cover element 110 has an annular shape.

5. The mechanical seal of claim 1, wherein the inner surface of the holder assembly includes a first sealing groove for seating a first sealing element and an axially spaced second sealing groove for seating a second sealing element.

6. The mechanical seal of claim 1, wherein the first groove is formed on one side of the fastener-receiving aperture and the second groove is formed on the other side of the fastener-receiving aperture.

7. The mechanical seal of claim 6, further comprising a first sealing element positioned for contacting the shaft and a second sealing element positioned for contacting the stationary seal ring.

8. A mechanical seal for mounting about a shaft, comprising
    a holder assembly having
        a main body having an inner surface and an opposed outer surface, wherein the main body has one or more fastener-receiving apertures formed therein and extending between the inner surface and the outer surface and being sized and configured for seating a fastener,
        first and second grooves formed in the outer surface, wherein the first groove is formed on one side of the fastener-receiving aperture and the second groove is formed on the other side of the fastener-receiving aperture,
    a rotary seal ring coupled to the holder assembly,
    a stationary seal ring disposed adjacent to the rotary seal ring, and
    a sealing cover element having a main body having a first leg portion, an opposed second leg portion, and an intermediate portion disposed between and coupled to the first and second leg portions,
    wherein the first leg portion of the sealing cover element is sized and configured for seating within the first groove, the second leg portion of the sealing cover element is sized and configured for seating within the second groove, and the intermediate portion of the sealing cover element covers the fastener-receiving aperture, and
    wherein the first groove is formed on one side of the fastener-receiving aperture and the second groove is formed on the other side of the fastener-receiving aperture.

* * * * *